3,314,803
MANNITOL FIXED FLAVOR AND METHOD OF MAKING SAME

Charles Dame, Jr., Tarrytown, N.Y., and Robert E. Smiles, Ramsey, N.J., assignors to General Foods Corporation, White Plains, N.Y., a corporation of Delaware
No Drawing. Filed Jan. 26, 1966, Ser. No. 523,038
11 Claims. (Cl. 99—140)

This application is a continuation-in-part of patent application 305,226, filed Aug. 28, 1963, now abandoned.

The present invention relates to a new flavor composition and, more particularly, to a flavoring composition containing a stable level of acetaldehyde.

It has been known for some time that acetaldehyde is an important flavor component of natural fruits and vegetables and serves as a flavor enhancer for the various flavor notes naturally present in meats, fruits and vegetables. Particularly, it has been found that acetaldehyde is very important in increasing the impact and freshness of certain flavors, such as fruit-type flavors. However, while the presence of acetaldehyde would be a valuable enhancer to a synthetic flavoring composition for use with a food formulation employing fruity-type flavors, it has not yet been possible to incorporate acetaldehyde into a stable, solid flavor fixative. Many attempts have been made to fix acetaldehyde in various compositions, but these compositions have all tended to be unstable and have lost substantially all of the acetaldehyde within several hours to one week thus providing no flavor enhancement on reconstitution after this period. This stability problem with acetaldehyde as a flavor enhancer is encountered when dessert and beverage formulations are processed or packaged in a manner allowing atmospheric or product moisture to become available for reaction with the acetaldehyde fixative during storage of the product. This problem is particularly acute when a fruit-type dessert or beverage formulation using an acetaldehyde fixed flavor is packaged in the dry form in a non-hermetically sealed paper envelope or container which is sufficiently pervious to allow atmospheric moisture to enter the container and react or dissolve with the various components in the formulation.

It would be desirable if a stable flavor enhancer containing acetaldehyde could be made and, more particularly, if a stable fixed acetaldehyde flavor could be produced for use in a dry fruit-flavored composition which could be packaged and stored under conditions subject to atmospheric moisture absorption.

It has now been discovered that a dry, non-hygroscopic flavor enhancer can be produced comprising mannitol and acetaldehyde, said acetaldehyde being present in a stable range of up to about 4% by weight of the total composition and being encapsulated by a matrix of mannitol solids.

While the flavoring composition of this invention can be incorporated in many food uses as a flavor enhancer for both natural and synthetic flavors, i.e. meat, vegetable and fruit flavors; it is particularly suitable for use with fruity-type flavors and, due to its high stability, in fruit beverages which tend to be hygroscopic due to being packaged and stored under non-hermetic conditions. The non-hygroscopic character of the mannitol fixed acetaldehyde also enables the flavor fixative to be used in food formulations having a higher initial terminal moisture range.

The acetaldehyde is fixed in mannitol according to this invention by first forming a solution of mannitol in water and preferably a super-saturated solution of mannitol, i.e. 25–45% mannitol solution. The super-saturated solution is formed by heating with agitation 2–10 parts by weight of mannitol with 10 parts by weight of water at 180°–212° F. until all of the mannitol is dissolved in the water and no mannitol crystals remain in the solution. The mannitol solution is then cooled while acetaldehyde is added thereto, the acetaldehyde being continually refluxed and thereby condensed into the mannitol solution until about 1–2 parts by weight of acetaldehyde are dissolved in the 10 parts by weight of water. The preferred ratio of mannitol to acetaldehyde may range from 2–6 parts by weight of mannitol to 1 part by weight of acetaldehyde. The acetaldehyde-mannitol solution may also be prepared by mixing the essential ingredients in a reflux tank and heating the solution to 130°–180° F. to thereby form a solution of mannitol and acetaldehyde.

It appears that the acetaldehyde helps to increase the solubility of the mannitol in water by inhibiting crystallization of the mannitol and the increased amount of mannitol in solution is thereby capable of entrapping a stable level of acetaldehyde during the drying step due to its high concentration. However, care must be taken in drying the super-saturated solution to avoid completely volatilizing the acetaldehyde or forming a non-entrapping dried mannitol composition.

The present invention involves forming a mannitol solution which upon drying will become supersaturated and will encapsulate the acetaldehyde in a matrix of the dried mannitol, the level of acetaldehyde in solution being substantially in excess of 4% by weight of the mannitol. In drying the solution the rate of evaporation of the water and the temperatures employed should be such as to avoid premature crystallization of the mannitol but rather should allow the mannitol solution to be dried into a solid form having the acetaldehyde embedded therein.

In drying the solution to accomplish the above results, it is a feature of this invention to spray dry, i.e. atomize the solution into discrete droplets which are dried in a fraction of a second to several seconds to thereby form an encapsulating matrix or shell of dry mannitol with the volatile acetaldehyde trapped inside the matrix material. It appears that while acetaldehyde is highly volatile and very miscible in water, the water as it vaporizes and passes through the dry outer shell regions of mannitol still leaves sufficient residual acetaldehyde to provide a stable fixation. Preferably, caution should be exercised in spray drying to cool the solution prior to spray drying to below room temperature (70° F.). Preferably, the atomizing device is a spinning disk which forms droplets by spraying the liquid feed by centrifugal force through small openings which atomize the droplets. The particle size of the droplets should be in the range of 10–300 microns and preferably below 200 microns, say 50–100 microns, the term particle size being employed herein to connote the average particle size of those particles constituting the significant intermediate 80% weight fraction of particles plotted on a particle size distribution curve. The drying temperatures used should be relatively mild, preferably in the range of 150°–300° F. inlet and 90°–170° F. outlet. The relatively small size of the droplets and the mild drying temperatures employed appear to enable an encapsulating coating of mannitol to form and trap a stable level of acetaldehyde. Preferably, the drying temperatures should be as low as possible and the particle size as small as possible.

Although this invention is not restricted to any particular theory, it is believed that by creating small droplets concomitant evaporation of water and acetadehyde occurs at a rate which enables sufficient retention of residual acetaldehyde for fixation. In this drying step the actaldehyde should not undergo premature volatilization before a sufficient concentration of encapsulating matrix solids is afforded. It is for this reason that low drying temperatures are employed. However, it is appreciated that as the particle size of the droplets is reduced the temperature of the drying air can be decreased.

The spray-dried mannitol-acetaldehyde composition will have initial fixation of 2–10% by weight acetaldehyde. But this initial fix will be modulated in several days and the level of acetaldehyde will equilibrate to a stable range up to 4%, usually between 1–3%. At this latter range, the flavor enhancer will be relatively immune to moisture pick-up and will have a prolonged shelf-life under normal storage conditions encountered commercially. Generally, the flavor enhancer of this invention will be limited in its use or shelf-life only by the shelf-life or stability of other ingredients in the particular food formulation. In the case of dry fruit-like beverage formulations, the flavor enhancer is ideally suited for use in a beverage of the non-carbonated type which can be packaged in moisture-pervious containers and stored under conditions which undergo moisture pick-up from the atmosphere. In food formulations which are packaged in sealed containers and protected from atmospheric moisture, the flavor fixative will have an added stability factor when the containers are opened and the contents subjected to atmospheric moisture conditions.

Also, the food formulation itself may contain higher levels of terminal product moisture without affecting the stability of the flavor fixative. Levels of moisture as high as 10–20% may be tolerated with the non-hygroscopic flavor enhancer of this invention. This will enable the use of certain ingredients which are hygroscopic or may contain significant amounts of water in the bound or unbound state, such as deliquescent food acids like citric acid and natural and artificial sweeteners which contain water of crystallization, e.g. dextrose monohydrate $(C_6H_{12}O_6 \cdot H_2O)$, soluble saccharin

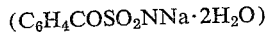

While it is preferred to spray dry the solution of mannitol and acetaldehyde under low temperature conditions, it is understood that any means may be employed for achieving a condition wherein the acetaldehyde is trapped or encapsulated in a matrix material composed predominantly of dried mannitol solids.

Among the dry-mix type food formulations in which the flavor enhancer of this invention may be employed are the following general formulas.

GELATIN JELLY DESSERT

Ingredients: Parts by wt.
- Sugar ---------------------------------- 80.0
- Gelatin --------------------------------- 10.0
- Citric acid ----------------------------- 3.0
- Trisodium citrate ----------------------- 1.2
- Fruit flavor ---------------------------- 0.6
- Fruit color ----------------------------- 0.2

LOW-CALORIE GELATIN DESSERT

Ingredients:
- Gelatin --------------------------------- 80.0
- Adipic acid ----------------------------- 10.0
- Mono- and disodium phosphate ------------ 4.0
- Sodium cyclamate ------------------------ 2.4
- Saccharin ------------------------------- 0.8
- Fruit color ----------------------------- 1.8
- Fruit flavor ---------------------------- 1.0

LOW-CALORIE BEVERAGE

Ingredients:
- Citric acid ----------------------------- 45.0
- Mannitol -------------------------------- 37.1
- Trisodium citrate ----------------------- 8.0
- Sodium cyclamate ------------------------ 5.6
- Saccharin ------------------------------- 0.9
- Tricalcium phosphate -------------------- 2.1
- Fruit flavor ---------------------------- 1.0
- Fruit color ----------------------------- 0.3

The composition of this invention may also be used generally as a flavor enhancer for developing meat and vegetable flavors in various food applications.

This invention will now be described by reference to the following specific examples. In the following examples the cooled solution was fed by gravity to the atomizing device; the pressure in the dryer being atmospheric. However, it is contemplated that the pressure in the drying chamber can be varied from atmospheric to 1000 p.s.i. as desired. There should be only a slight differential pressure between the pumping device and the drying chamber to avoid flashing the acetaldehyde.

Example 1

Two tanks jacketed for both steam and cold water were connected by separate pipes to a condenser. About 40 lbs. of mannitol and 100 lbs. of water were then placed in one tank equipped with an agitator and 16 lbs. of chilled acetaldehyde (32° F.) were placed in the other tank. The mannitol water mixture was then heated to 212° F. by running steam through the heat exchanger and the solution was agitated to completely dissolve the mannitol. The solution was then cooled to 180° F. Ice water at 35° F. was then circulated through the condenser in order to provide a condensing atmosphere for the acetaldehyde vapors. The tanks were then sealed, being open to atmosphere only through the condenser.

The acetaldehyde was distilled into the mannitol solution by raising the temperature of the acetaldehyde to boiling by passing water at 150°–170° F. through the jacket of the tank containing the acetaldehyde. During this time, the mannitol solution was continually cooled and agitated while receiving the distilling acetaldehyde. However, some refluxing of the acetaldehyde occured during this operation as the temperature of the mannitol solution was about 170°–180° F. during distillation. After all of the acetaldehyde was added, the solution was cooled to below 80° F. and kept at this temperature until ready for the spray-drying operation.

Prior to spray-drying the mannitol-acetaldehyde solution was further chilled to about 40° F. and then transported to a spray-drying tower wherein the solution was atomized through a spinning disk atomizer into droplets having a maximum particle size of about 100–200 microns. The particles were dried in a spray dryer of the double cone type, 12 feet in diameter and 40 feet in height, the inner cone being air cooled. The solution was fed by a gravity feed onto a vertical tube which discharged onto the 10 inch spinning disk rotating at 12,000 r.p.m. Feed rate of the solution was 260 lbs. of solution per hour. The drying air was admitted through a vertical inlet just above the spinning disk atomizer at an inlet air temperature of 220° F. and an outlet air temperature of 145° F.

Initial fixation of the acetaldehyde was about 4.5% by weight of the total composition. However, after several days exposure in paper envelopes at 90° F. and 85% relative humidity the fixation of acetaldehyde was depleted to about 2.3% and remained relatively stable at this level. The mannitol fixed acetaldehyde was then incorporated in a non-carbonated fruit beverage having the following formulation.

Ingredients:

| | Percent by wt. |
|---|---|
| Dextrose monohydrate | 76.38 |
| Citric acid | 22.57 |
| Orange flavor and color | 1.05 |
| | 100.00 |

About 12 mg. of acetaldehyde in the mannitol-acetaldehyde composition was employed in 14 gm. samples of the beverage formulation. The formulations were then packaged in paper envelopes which were non-hermetically sealed and subject to moisture pick-up from the atmosphere. The packaged formulations were then exposed to a temperature of 100° F. at a relative humidity of 30%. After 3–4 months the mannitol compositions were found to still retain 2.0% acetaldehyde. At the end of this time, the product was found to reconstitute with 6 ounces of ice water to give a distinctly fresher and more pronounced orange flavor when compared to a control orange flavor when compared to a control orange beverage containing no acetaldehyde.

*Example 2*

About 40 grams mannitol, 50 ml. of water and 20 ml. of acetaldehyde were placed in a 250 ml. flask and heated slowly under a condenser by means of a steam bath to dissolve all the mannitol. The solution was raised in temperature to about 130°–175° F. and allowed to boil for two minutes until the solution became clear, the acetaldehyde being continually refluxed all this time. The clear solution was then cooled to about 40° F. and spray dried into a drying chamber having about 45 cubic feet of drying volume. The solution was fed by gravity into a 2-inch diameter spinning disk rotating at 50,000 r.p.m. Drying air having a temperature of 250° F. was admitted through a vertical inlet just below the spinning disk atomizer. Outlet air temperature was 135° F.

About 30% of the available acetaldehyde was retained in the spray dried mannitol to give a total fixation of about 10% by weight of acetaldehyde in the mannitol. However, after one week exposure at 90° F. and 85% relative humidity the level of acetaldehyde depleted to about 2.4% by weight of the total composition and remained relatively stable at this level. The mannitol-fixed acetaldehyde composition was then employed in a dry, non-carbonated beverage formulation which was stored in non-hermetically sealed paper envelopes according to the procedure of Example 1. The composition was found to retain substantially all of the acetaldehyde over a period of 3–4 months, analytical measurements showed that the acetaldehyde was present in the concentration of 2.0% by weight of the acetaldehyde-mannitol composition. The rehydrated beverage had a distinctly fresher and more pronounced flavor when compared to a control sample without the mannitol-fixed flavor.

While this invention has been described by reference to specific examples, it is understood to be limited only by the scope of the appended claims.

What is claimed is:

1. A process for making a dry flavor enhancer containing a stable level of acetaldehyde in an amount effective to produce flavor enhancement which comprises forming an aqueous solution of mannitol and acetaldehyde and spray-drying said solution to obtain a powdered product.

2. The process of claim 1 wherein the solution is supersaturated with respect to the mannitol.

3. The process of claim 2 wherein the solution contains 2–6 parts by weight of mannitol per part of acetaldehyde.

4. The process of claim 3 wherein the solution of mannitol and acetaldehyde is cooled to below about room temperature, without crystallizing the mannitol, prior to drying.

5. A process for making a dry, stable flavor enhancer containing acetaldehyde in an amount effective to produce flavor enhancement up to about 4% by weight which comprises forming a supersaturated solution of 2–10 parts by weight of mannitol, and 1–2 parts by weight of acetaldehyde in 10 parts by weight of water, cooling said solution to below about room temperature without crystallizing the mannitol, atomizing said solution into droplets and passing said droplets through a drying chamber whereby a powdered product is obtained.

6. The process of claim 5 wherein said solution is atomized to a droplet size of 10–300 microns.

7. The process of claim 6 wherein said solution is atomized to a droplet size of less than 200 microns.

8. A dry, non-hygroscopic stable flavor enhancer comprising mannitol and acetaldehyde, said acetaldehyde being present in a concentration effective to produce flavor enhancement of up to 4% by weight of the total composition.

9. A dry, powdered, fruit flavored food composition containing the flavor enhancer of claim 8.

10. The composition of claim 9 wherein said composition is a non-carbonated beverage formulation.

11. The composition of claim 9 wherein the composition contains a sweetening agent which contains water of crystallization.

References Cited by the Examiner

UNITED STATES PATENTS

| 2,824,807 | 2/1958 | Laster et al. | 99—140 X |
| 2,904,440 | 9/1959 | Demeck et al. | 99—140 |
| 2,929,723 | 3/1960 | Schultz | 99—140 |

A. LOUIS MONACELL, *Primary Examiner.*

JOSEPH M. GOLIAN, *Examiner.*

H. H. KLARE, *Assistant Examiner.*